US012611653B1

(12) United States Patent
Omran et al.

(10) Patent No.: US 12,611,653 B1
(45) Date of Patent: *Apr. 28, 2026

(54) NANOCOMPOSITE FOR DEGRADING ORGANIC CONTAMINANTS

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,717

(22) Filed: Jul. 8, 2025

(51) Int. Cl.
B01J 23/28 (2006.01)
B01J 23/02 (2006.01)
(Continued)

(52) U.S. Cl.
CPC .............. *B01J 23/28* (2013.01); *B01J 23/02* (2013.01); *B01J 27/24* (2013.01); *B01J 35/39* (2024.01); *B01J 35/45* (2024.01); *B01J 35/51* (2024.01); *B01J 35/613* (2024.01); *B01J 35/615* (2024.01); *B01J 35/633* (2024.01); *B01J 35/635* (2024.01); *B01J 35/647* (2024.01); *B01J 35/67* (2024.01); *B01J 37/031* (2013.01); *B01J 37/04* (2013.01); *B01J 37/08* (2013.01); *B01J 37/343* (2013.01); *C02F 1/32* (2013.01); *C02F 1/725* (2013.01); *C02F 2101/308* (2013.01); *C02F*

*2101/327* (2013.01); *C02F 2101/345* (2013.01); *C02F 2101/366* (2013.01); *C02F 2305/10* (2013.01)

(58) Field of Classification Search
CPC . C02F 1/30; C02F 1/32; C02F 2305/10; B01J 23/28
See application file for complete search history.

(56) References Cited

U.S. PATENT DOCUMENTS

2014/0246371 A1    9/2014  Cao et al.

FOREIGN PATENT DOCUMENTS

| CN | 111715284 A | 9/2020 |
| CN | 115212908 B | 8/2024 |
| CN | 118807812 A | 10/2024 |

OTHER PUBLICATIONS

Yao. Synthesis and enhanced visible-light photocatalytic activity of wollastonite/g-C3N4 composite. Materials Research Bulletin 86 186-193 (2017) (Year: 2017).*

(Continued)

*Primary Examiner* — Matthew E. Hoban
(74) *Attorney, Agent, or Firm* — Oblon, McClelland, Maier & Neustadt, L.L.P.

(57) ABSTRACT

A method of photocatalytic degradation utilizes a particulate crystalline nanocomposite with a radiation having a wavelength of 100 to 800 nm. The particulate crystalline nanocomposite includes a tetragonal calcium molybdate $(CaMoO_4)$ crystalline phase, a calcium silicate $(CaSiO_3)$ crystalline phase, and a graphitic carbon nitride $(C_3N_4)$ crystalline phase, where at least a fraction of the graphitic-$C_3N_4$ is in the form of mesoporous nanosheets.

18 Claims, 7 Drawing Sheets

(51) Int. Cl.

| | |
|---|---|
| *B01J 27/24* | (2006.01) |
| *B01J 35/39* | (2024.01) |
| *B01J 35/45* | (2024.01) |
| *B01J 35/51* | (2024.01) |
| *B01J 35/61* | (2024.01) |
| *B01J 35/63* | (2024.01) |
| *B01J 35/64* | (2024.01) |
| *B01J 35/67* | (2024.01) |
| *B01J 37/03* | (2006.01) |
| *B01J 37/04* | (2006.01) |
| *B01J 37/08* | (2006.01) |
| *B01J 37/34* | (2006.01) |
| *C02F 1/32* | (2023.01) |
| *C02F 1/72* | (2023.01) |
| *C02F 101/30* | (2006.01) |
| *C02F 101/32* | (2006.01) |
| *C02F 101/34* | (2006.01) |
| *C02F 101/36* | (2006.01) |

(56) References Cited

OTHER PUBLICATIONS

Santiago. Enhanced photocatalytic activity of CaMoO4/g-C3N4 composites obtained via sonochemistry synthesis. Materials Research Bulletin 146 111621 (Year: 2022).*

Castro. Improvement of dye degradation by photocatalysis and synergistic effect of sonophotocatalysis processes using CaMoO4/g-C3N4 heterojunction. Optik—International Journal for light and electron optics. 300 171682 (Year: 2024).*

* cited by examiner

NANOCOMPOSITE FOR DEGRADING ORGANIC CONTAMINANTS

BACKGROUND

Technical Field

The present disclosure is directed towards a method of degrading organic contaminants, and more particularly, relates to a method for degrading organic contaminants using a particulate crystalline nanocomposite and a method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The increasing discharge of chemicals and industrial byproducts into wastewater has posed a serious threat to the groundwater and surface water quality. The byproducts contain both organic and inorganic contaminants, which pose severe risks and potential environmental damage. Contaminants of heavy metal ions such as cadmium (Cd), chromium (Cr), copper (Cu), iron (Fe), lead (Pb), nickel (Ni), silver (Ag), zinc (Zn), and uranium (U) are particularly concerning due to their toxicity, carcinogenicity, and non-biodegradability, and further raise concerns for public health and environmental safety. Industries such as chemicals, textiles, plastics, mining, and paper contribute significantly to heavy metal pollution, particularly in a condition where wastewater is discharged without any treatment. Such untreated wastewater endangers aquatic ecosystems, and sometimes even becomes lethal to aquatic species when certain contaminants exist at high concentrations. Innovative wastewater treatment technologies capable of effectively removing and degrading pollutants into non-harmful constituents are essential to ensure sustainable water management.

Various remediation methods, including membrane filtration, ion exchange, coagulation, precipitation, reverse osmosis, and adsorption, have been explored to eliminate metal ions in the wastewater, among which adsorption is especially advantageous due to its affordability, ease of use, and exceptional exclusion capabilities at trace levels. However, conventional adsorption methods often suffer from high operational costs, secondary waste generation, and limited efficiency for persistent pollutants. To overcome these drawbacks, photocatalysis has emerged as a sustainable alternative, leveraging light-driven reactions to degrade contaminants into harmless byproducts, offering a cost-effective and eco-friendly solution for water purification.

Sunlight-driven semiconductor photocatalytic technology has been reported as an efficient wastewater treatment and reuse. The photocatalytic reaction follows three fundamental steps: excitation of the semiconductor catalyst by a light source to generate photogenerated electron-hole pairs, separation and migration of charge carriers, and execution of redox reactions on the catalyst surface. Continuous illumination is essential for photocatalysis for continuous electron-hole pair generation. However, the sunlight is not storable, therefore limits the applications of the solar-driven photocatalysis. To address this limitation, advancements in photocatalyst design such as heterojunction formation, doping, and surface modification have been explored to enhance charge separation, extend light absorption, and improve stability, ensuring more efficient and sustained photocatalytic activity. However, challenges such as limited visible-light absorption, low efficiency, and poor stability remain, where many research focuses on enhancing light absorption, charge separation, and catalyst durability. Carbon-based nanoparticles, with their high surface area, conductivity, and stability, become a promising candidate of the photocatalyst. Incorporating electroactive species or composites like graphene further improves their performance, making them highly effective for photocatalysis and sustainable pollutant degradation. Consequently, researchers are focusing on electrocatalysts capable of overcoming the limitations of existing materials while efficiently removing pollutants, thereby enhancing water quality and ensuring a healthier environment for both humans and aquatic life.

Accordingly, one object of the present disclosure is to provide a method of degrading organic contaminants using a particulate crystalline nanocomposite, that may circumvent the drawbacks and limitations, such as low stability, limited visible-light absorption, and inefficient pollutant degradation, of the methods and materials already known in the art.

SUMMARY

In an exemplary embodiment, a method of photocatalytic degradation is described. The method includes contacting a particulate crystalline nanocomposite with an aqueous medium comprising one or more contaminants to form a pre-irradiation mixture, irradiating the pre-irradiation mixture with a radiation having a wavelength (A) of from about 100 nanometers (nm) to about 800 nm, thereby degrading the one or more contaminants on the particulate crystalline nanocomposite. The particulate crystalline nanocomposite includes a tetragonal calcium molybdate ($CaMoO_4$) crystalline phase, a calcium silicate ($CaSiO_3$) crystalline phase, and a graphitic carbon nitride ($C_3N_4$) crystalline phase, where at least a fraction of the graphitic-$C_3N_4$ is in the form of mesoporous nanosheets.

In some embodiments, the one or more organic contaminants include one or more compounds of polyaromatic hydrocarbons and their halogenated derivatives, phenols and their halogenated derivatives, furanes and their halogenated derivatives, dioxines and their halogenated derivatives, biphenyls and their halogenated derivatives, and organic dyes.

In some embodiments, a ratio by weight of $CaMoO_4$ to $CaSiO_3$ to graphitic-$C_3N_4$ in the particulate crystalline nanocomposite is about (0.8-1.2) to (0.8-1.2) to (0.8-1.2).

In some embodiments, at least a fraction of the $CaMoO_4$ and at least a fraction of the $CaSiO_3$ of the particulate crystalline nanocomposite are in the form of substantially spherical particles.

In some embodiments, at least 50 wt. % of the $CaMoO_4$ of the particulate crystalline nanocomposite is in the form of substantially spherical particles based on a total weight of the $CaMoO_4$, and at least 50 wt. % of the $CaSiO_3$ of the particulate crystalline nanocomposite is in the form of substantially spherical particles based on a total weight of the $CaSiO_3$.

In some embodiments, the substantially spherical particles have an average particle size of from about 5 nanometers (nm) to about 20 nm.

In some embodiments, at least 80 wt. % of the graphitic-$C_3N_4$ is in the form of mesoporous nanosheets, based on a total weight of the graphitic-$C_3N_4$.

In some embodiments, the particulate crystalline nanocomposite has a monomodal pore size distribution.

In some embodiments, the particulate crystalline nanocomposite has an average pore diameter of from about 15 nm to about 25 nm.

In some embodiments, the particulate crystalline nanocomposite has a surface area of from about 60 square meters per gram ($m^2/g$) to about 100 $m^2/g$, as determined by analysis.

In some embodiments, the particulate crystalline nanocomposite has a Brunauer-Emmett-Teller (BET) surface area of from about 70 $m^2/g$ to about 90 $m^2/g$.

In some embodiments, the particulate crystalline nanocomposite has a pore volume of from about 0.1 cubic centimeters per gram ($cm^3/g$) to about 0.5 $cm^3/g$.

In some embodiments, the particulate crystalline nanocomposite has a band gap energy ($E_g$) between a valence band and a conduction band of from about 2.8 to about 3.2 eV.

In some embodiments, a method of preparing the particulate crystalline nanocomposite is described. The method includes forming a solution of a calcium (Ca) salt and an alkali metal silicate in a solvent including water and a $C_1$-$C_4$ alkanol, heating the solution at a temperature of from about 150 degree Celsius (° C.) to about 250° C. to form a dry product of $CaSiO_3$, forming graphitic-$C_3N_4$ by heating urea in a closed vessel at a temperature of about 500° C. to about 700° C., forming an acidified solution in a polar protic solvent of a molybdenum salt and a reducing sugar, heating the acidified solution at a temperature of from about 150° C. to about 250° C. for a sufficient duration to carbonize the reducing sugar and form a carbonized product, comminuting the carbonized product of the heating stage to form a comminuted carbonized product, calcining the comminuted carbonized product at a temperature of from about 500° C. to about 1200° C. for a duration of from about 1 hour (h) to about 5 hours to form $MoO_3$, dispersing the $CaSiO_3$, graphitic-$C_3N_4$ and $MoO_3$ in a polar protic solvent and heating the dispersion at a temperature of from about 150° C. to about 250° C. at a pressure of from about 2 Bar to about 8 Bar to form the particulate crystalline nanocomposite in a form of a solid, and separating the solid particulate crystalline nanocomposite from the heated dispersion.

In some embodiments, the contacting has a duration of from about 1 minutes to about 120 minutes.

In some embodiments, the contacting has a duration of from about 5 minutes to about 30 minutes.

In some embodiments, the radiation has a wavelength of from about 100 nm to about 500 nm.

In some embodiments, the particulate crystalline nanocomposite is dispersed within the aqueous medium.

In some embodiments, the particulate crystalline nanocomposite is in an amount of from about 0.1 grams per liter (g/L) to about 5 g/L of the aqueous medium.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
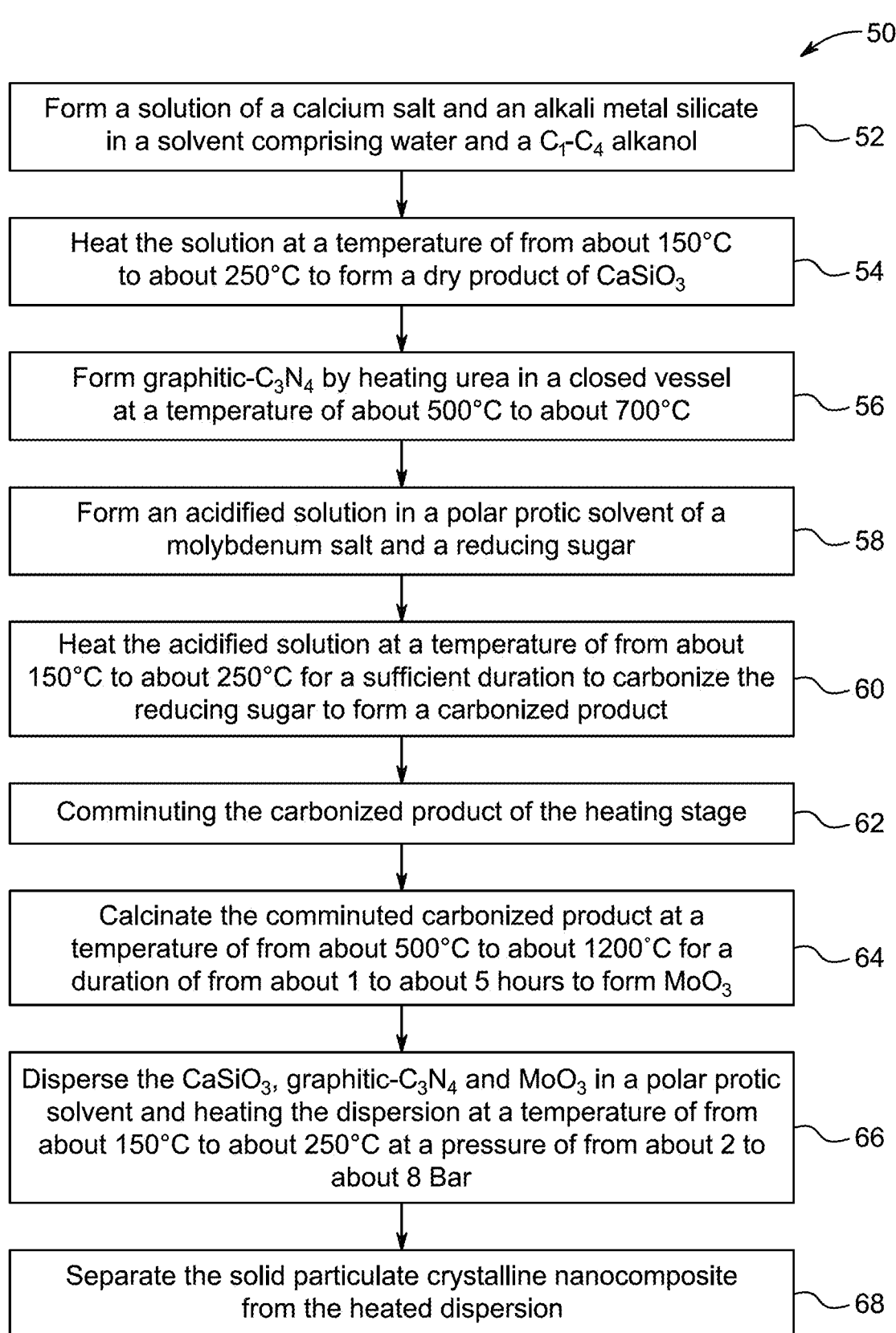
FIG. 1 illustrates an exemplary flow chart for a method of producing a particulate crystalline nanocomposite ($CaMoO_4$/$CaSiO_3$/g-$C_3N_4$), according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words 'a', 'an', and the like generally carry a meaning of 'one or more,' unless stated otherwise.

Furthermore, the terms 'approximately', 'approximate', 'about', and similar terms generally refer to ranges that include the identified value within a margin of 20%, 10%, or preferably 5%, and any values therebetween.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include 13C and 14C. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

As used herein, the term 'amount' refers to the level or concentration of one or more reactants, catalysts, or materials present in a reaction mixture.

As used herein, the term 'nanocomposite' refers to a composite material that has at least one component with a grain size measured in nanometer (nm).

As used herein, the term 'average pore diameter' refers to the mean size of the pores in a porous material, typically measured in nanometers (nm) or micrometers (mm), and indicates the typical spacing between the pore walls.

As used herein, the term 'total pore volume' refers to the total volume of all the pores within a porous material, typically measured in cubic centimeters per gram ($cm^3/g$), and represents the material's capacity to hold fluids or gases.

As used herein, the term 'particulate crystalline nanocomposite' refers to a material composed of nanoparticles embedded in a crystalline matrix, where the nanoparticles are typically in the range of 1-100 nm. These composites combine the unique properties of both the nanoparticles and the crystalline matrix, such as enhanced strength, conductivity, or other specific functionalities. The crystalline structure provides stability, while the nanoparticles offer benefits such as improved mechanical properties, electrical conductivity, or optical characteristics.

As used herein, the term 'tetragonal crystalline phase' refers to a type of crystal structure where the unit cell (the smallest repeating unit in a crystal) has two equal dimensions (length and width) but a different height (depth). This results in a rectangular base and a vertical axis of a different length, forming a prism-like shape. In a tetragonal lattice, the angles between the axes are all 90 degrees.

As used herein, the term '$CaSiO_3$ crystalline phase' refers to a structure formed by calcium silicate, where calcium (Ca) and silicon (Si) atoms are bonded with oxygen (O) atoms in a specific arrangement.

As used herein, the term 'graphitic-$C_3N_4$ crystalline phase' refers to a carbon nitride structure that is similar to graphite but consists of carbon (C) and nitrogen (N) atoms. This material has a layered, two-dimensional structure and exhibits properties such as semiconductor behaviours, high thermal stability, and photocatalytic activity.

As used herein, the term 'average particle size' refers to the average particle size at which 50% of the total particle volume is made up of particles smaller than this size, and 50% is made up of particles larger.

As used herein, the term 'alkanol' refers to an alcohol derived from an alkane (a saturated hydrocarbon) by replacing one hydrogen atom with a hydroxyl group (—OH). Alkanols are organic compounds that contain a hydroxyl group attached to a carbon atom, which is part of a straight or branched alkane chain. Common examples of alkanols include methanol, ethanol, propanol, and butanol.

A reducing sugar is a type of sugar that has a free aldehyde group (—CHO) or a free ketone group (—C═O), which can donate electrons to reduce other compounds. These sugars can reduce metal ions or participate in redox reactions due to the presence of these reactive functional groups.

As used herein, the term 'organic pollutant' refers to a type of pollutant that contains carbon-based compounds, generally originating from human activities. These pollutants may come from sources like pesticides, industrial chemicals, plastics, and solvents. They tend to be harmful to the environment and living organisms, as they can be toxic, persistent, and bioaccumulate in ecosystems. Examples include substances such as benzene, dichlorodiphenyl-trichloroethane (DDT), and polychlorinated biphenyls (PCBs).

The organic pollutant may be a dye, a phenol, a polycyclic aromatic hydrocarbon, an herbicide, a pesticide, a persistent organic pollutant, or so on. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamino-2,3-dihydroanthraquinone, 7,14-dibenzypyrenequinone, dibromoanthrone, 1,3-dihydroxyan-thraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopy-rogallol red, chlorophenol red, coomassie brilliant blue, cresol red, O-cresolphthalein, crystal violet, dichlorofluo-rescein, ethyl green, fast green FCT, FIAsH-EDT2, fluoran, fuchsine, green S, light green SF, malachite green, merbro-min, metacresol purple, methyl blue, methyl violet, naph-tholphthalein, new fuchsine, pararosaniline, patent blue V, phenol red, phenolphthalein, phthalein dye, pittacal, spirit blue, thymol blue, thymolphthalein, Victoria blue BO, Vic-toria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thi-azine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as 'weedkiller') is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, sil-thiofam, simeconazole, spiroxamine, streptomycin, tebuconazole, tebufloquin, teclofthalam, teenazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane. The organic contaminants are selected from the group consisting of: polyaromatic hydrocarbons and their halogenated derivatives, phenols and their halogenated derivatives, furanes and their halogenated derivatives, dioxines and their halogenated derivatives, biphenyls and their halogenated derivatives, and organic dyes.

Aspects of the present disclosure are directed to a $CaMoO_4/CaSiO_3/g-C_3N_4$ nanocomposite synthesized through a simple hydrothermal method for use as an efficient photocatalyst.

A method of degrading one or more organic contaminants is described. The method includes contacting a particulate crystalline nanocomposite with an aqueous medium comprising one or more contaminants to form a pre-irradiation mixture. Degrading refers to the process of breaking down of pollutants or contaminants into simpler, less harmful components. The degrading may occur through natural processes such as microbial action or through chemical reactions. The aqueous medium refers to a solution where water is the primary solvent. The aqueous medium may contain various dissolved substances such as salts, organic compounds, gases, or minerals, depending on the specific environment or application. The aqueous medium contains water along with contaminants such as pollutants, as well as potential chemicals or microorganisms involved in the degradation process. The aqueous medium may be commonly sourced from natural bodies of water, such as rivers, lakes, or oceans, or the aqueous medium may be obtained from industrial processes, wastewater treatment facilities, or laboratory settings. In some embodiments, the aqueous medium consists primarily of water, but may also include dissolved minerals, organic matter, and microorganisms. In some embodiments, the aqueous medium may be artificially prepared, such as in chemical experiments or when purifying water for specific purposes, containing controlled levels of salts, acids, or other compounds to support the desired reactions or processes. In a preferred embodiment, the aqueous medium contains one or more contaminants.

The method further includes irradiating the pre-irradiation mixture with a radiation having a wavelength of from about 100 to about 800 nm, preferably from about 100 to about 500 nm, preferably 200 to about 500 nm. Sources of irradiation for the method may include ultraviolet (UV) lamps, visible light sources, lasers, mercury vapor lamps, or X-ray sources. In a preferred embodiment, the source of irradiation for the method is the visible light source. In a preferred embodiment, the source of the irradiation is visible light sources.

In some embodiments, the particulate crystalline nanocomposite is dispersed within the aqueous medium. In some embodiments, the particulate crystalline nanocomposite is in an amount ranging from about 0.1 to about 5 grams per liter, preferably 1 to 5 grams per liter, preferably 2 to 5 grams per liter, preferably 3 to 5 grams per liter, preferably 4 to 5 grams per liter, of the aqueous medium.

The particulate crystalline nanocomposite includes a tetragonal $CaMoO_4$ crystalline phase, a $CaSiO_3$ crystalline phase, and a graphitic-$C_3N_4$ crystalline phase. In some embodiments, the nanocomposite may include crystalline phases, but is not limited to quartz, calcite, hematite, magnetite, goethite, dolomite, albite, anorthite, pyrite, fluorite, halite, barite, apatite, rutile, and zircon. In some embodiments, a ratio by weight of $CaMoO_4$ to $CaSiO_3$ to graphitic-$C_3N_4$ in the particulate crystalline nanocomposite ranges from (0.8-1.2) to (0.8-1.2) to (0.8-1.2), preferably (0.9-1.2) to (0.9-1.2) to (0.9-1.2), preferably (1.0-1.2) to (1.0-1.2) to (1.0-1.2), preferably (1.1-1.2) to (1.1-1.2) to (1.1-1.2). In a preferred embodiment, the ratio by weight of $CaMoO_4$ to $CaSiO_3$ to graphitic-$C_3N_4$ in the particulate crystalline nanocomposite is 1 to 1 to 1.

In some embodiments, the particulate crystalline nanocomposite comprises sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, the particulate crystalline nanocomposite material has a two-dimensional porous structure constructed with curled and wrinkled nanosheets and platelets of the g-$C_3N_4$. In one embodiment, a fraction of the graphitic-$C_3N_4$ is in the form of mesoporous nanosheets. In some embodiment, at least 80 wt. %, preferably 82 wt. %, preferably 84 wt. %, preferably 86 wt. %, preferably 88 wt. %, preferably 90 wt. % of the graphitic-$C_3N_4$ is in the form of mesoporous nanosheets, based on a total weight of the graphitic-$C_3N_4$.

In an embodiment, the particulate crystalline nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In some embodiments, the nanocomposite may be porous, and the pores are in the form of slits.

At least a fraction of the $CaMoO_4$ and at least a fraction of the $CaSiO_3$ of the particulate crystalline nanocomposite are in the form of substantially spherical particles, which significantly enhances its performance in degrading the organic contaminants. In some embodiments, at least 50 wt. %, preferably 52 wt. %, preferably 54 wt. %, preferably 56 wt. %, preferably 58 wt. %, preferably 50 wt. % of $CaMoO_4$ and $CaSiO_3$ of the particulate crystalline nanocomposite is in the form of substantially spherical particles, based on a total weight of the $CaMoO_4$ and the $CaSiO_3$, respectively. This spherical morphology improves the particulate crystalline nanocomposite's surface area and dispersion, facilitating better interaction with the organic contaminants. The increased surface area and uniform particle distribution enhance the efficiency of photocatalytic processes, leading to more effective degradation of the organic pollutants in the aqueous medium. Furthermore, the spherical particles enhance light absorption and improve the overall stability and activity of the particulate crystalline nanocomposite. In some embodiments, the substantially spherical particles have an average particle size of from about 5 to about 20 nm, preferably 6 to 10 nm, preferably 9.2 nm.

In some embodiments, the average pore distribution of the particulate crystalline nanocomposite may include, but is not limited to, crystalline average pore distribution, bimodal, trimodal, multimodal, narrow, broad, and Gaussian. In a preferred embodiment, the particulate crystalline nanocomposite has a monomodal pore size distribution, as determined by Barrett-Joyner-Halenda (BJH) desorption analysis, which provides a uniform and predictable pore structure. The monomodal distribution enhances the efficiency of processes such as adsorption, catalysis, and pollutant removal, by ensuring consistent and enhanced surface area and pore accessibility.

In some embodiments, the particulate crystalline nanocomposite has an average pore diameter of from about 15 to about 25 nanometers (nm), preferably 16 to 20 nm, preferably 18.92 nm.

In some embodiments, the particulate crystalline nanocomposite has a Brunauer-Emmett-Teller (BET) surface area of from about 60 to about 100 square meter per gram ($m^2/g$). The particulate crystalline nanocomposite has a BET surface area of from about 70 to about 90 $m^2/g$, preferably 75 to 80 $m^2/g$, preferably 78.1 $m^2/g$.

In some embodiments, the particulate crystalline nanocomposite has a pore volume of from about 0.1 to about 0.5 cubic centimeter per gram ($cm^3/g$), preferably 0.15 to 0.3 $cm^3/g$, preferably 0.21 $cm^3/g$.

In some embodiments, the particulate crystalline nanocomposite has discrete valence and conduction bands, thereby providing enhanced control over the electronic properties of the particulate crystalline nanocomposite. The distinct separation of these bands facilitates improved charge carrier mobility and minimizes recombination rates. The band gap between the valence band and the conduction band is from about 2.8 to about 3.2 electron volts (eV), preferably 2.85 to 3.0 eV, preferably 2.94 eV. In a preferred embodiment, the particulate crystalline nanocomposite has a band gap energy of 2.94 eV.

FIG. 1 illustrates a schematic flow chart of a method 50 of preparing the particulate crystalline nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent including water and a $C_1$-$C_4$ alkanol. In some embodiments, calcium salt may include but is not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In a preferred embodiment, calcium salt is calcium nitrate.

In some embodiments, alkali metal silicate may include but is not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate. In some embodiments, the molar ratio of the calcium salt to the alkali metal silicate may include, but not limited to, 1:5 to 5:1, preferably 1:4 to 4:1, preferably 3:1 to 1:3, preferably 1:2 to 2:1, preferably 1:1.

In some embodiments, $C_1$-$C_4$ alkanol may include but is not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, alkanol is ethanol. The volume-by-volume (v/v) ratio of water to ethanol is in the range of 1:5 to 5:1, preferably 1:4 to 4:1, preferably 1:3 to 3:1, preferably 1:2 to 2:1, preferably 1:1. In a preferred embodiment, the v/v ratio of water to ethanol is 1:1.

At step 54, the method 50 includes heating the solution at a temperature of from about 150 to about 250° C., preferably 160 to 200° C., preferably 180° C. to form a dry product of $CaSiO_3$. This step involves the chemical reaction and dehydration process that are necessary for converting the precursor materials into the desired solid product. The solution is preferably heated in an autoclave, optionally, other known heating appliances may be used as well. In some embodiments, the solution is heated for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solution is heated for 2 hours.

At step 56, the method 50 includes forming graphitic-$C_3N_4$ by heating urea in a closed vessel at a temperature of about 500 to about 700° C. In some embodiments, the urea is heated in a closed vessel at a temperature in a range from 500 to 700° C., preferably 550 to 700° C., preferably 600 to 700° C., preferably 650 to 700° C. In a preferred embodiment, the urea is heated in a closed vessel at 600° C. In some embodiments, the urea is heated in a closed vessel for 10 to 60 minutes, preferably 20 to 60 minutes, preferably 30 to 60 minutes, preferably 40 to 60 minutes, preferably 50 to 60 minutes. In a preferred embodiment, the urea is heated in a closed vessel for 45 minutes.

At step 58, the method 50 includes forming an acidified solution in a polar protic solvent of a molybdenum salt and a reducing sugar. In some embodiments, the acidified solution may include acid selected from the group consisting of hydrochloric acid (HCl), sulfuric acid ($H_2SO_4$), perchloric acid ($HClO_4$), boric acid ($H_3BO_3$), and nitric acid ($HNO_3$). In some embodiments, the acid may include, but is not limited to, phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid, carbonic acid. The acid is $HNO_3$.

In this reaction, the molybdenum salt is reduced by the reducing sugar in an acidified aqueous solution, leading to the formation of reduced molybdenum species. Suitable examples of the molybdenum salt include, but are not limited to, lithium molybdate, sodium molybdate, potassium molybdate and ammonium molybdate. In a preferred embodiment, the molybdenum salt is ammonium molybdate.

Suitable examples of reducing sugar include, but are not limited to, glucose, fructose, galactose, ribose, maltose, lactose to name a few. These reducing sugars may facilitate the reduction of various metal salts to its lower oxidation states in an acidified aqueous solution, depending on the specific reaction and desired product. In some embodiments, the reducing sugar may be monosaccharides, disaccharides, oligosaccharides, and polysaccharides, based on the number of sugar units they contain. In a preferred embodiment, the reducing sugar is a monosaccharide selected from the group including. trioses, tetroses, pentoses, hexoses and heptoses. In another preferred embodiment, the reducing sugar is selected from the group including erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, and sedoheptulose. In yet another preferred embodiment, the reducing sugar is xylose.

In some embodiments, the w/w ratio of the molybdate salt to the reducing sugar is 1:5 to 5:1, preferably 1:4 to 4:1, preferably 1:3 to 3:1, preferably 1:2 to 2:1, preferably 1:1.

At step 60, the method 50 includes heating the acidified solution at a temperature of from about 150 to about 250° C. for a sufficient duration to carbonize the reducing sugar, such as xylose, in the presence of the acidified solution. The temperature range ensures efficient carbonization while preventing decomposition of the desired product. During the heating stage, the reducing sugar undergoes dehydration and polymerization to form a black carbonaceous material, which serves as the precursor for further processing.

In some embodiments, the acidified solution is heated at a temperature in a range from 150 to 250° C., preferably 170 to 250° C., preferably 190 to 250° C., preferably 210 to 250° C., preferably 230 to 250° C. In a preferred embodiment, the solution is heated at 120° C. In some embodiment, the acidified solution is heated for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the acidified solution is heated for 3 hours.

At step 62, the method 50 includes comminuting the carbonized product of the heating stage, typically by grinding or milling in a mortar and pestle or a ball mill, to reduce the particle size to a desired range, such as 50-200 microns, to facilitate further processing. The comminution process ensures uniformity in the particle size, which is crucial for subsequent calcination and synthesis steps.

At step 64, the method 50 includes calcining the comminuted carbonized product at a temperature of from about 500 to about 1200° C. for a duration of from about 1 to about 5 hours to form $MoO_3$. Calcination is done to convert the carbonized product into $MoO_3$ by driving off volatile components and promoting the oxidation of the material at high temperatures, ensuring the formation of the desired molybdenum trioxide.

In some embodiments, the solid is calcined at a temperature in a range from 500 to 1200° C., preferably 600 to 1200° C., preferably 700 to 1200° C., preferably 800 to 1200° C., preferably 900 to 1200° C., preferably 1000 to 1200° C., preferably 1100 to 1200° C. In a preferred embodiment, the solid is calcined at 550° C. In some embodiments, the solid is calcined for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solid is calcined for 4 hours.

At step 66, the method 50 includes dispersing the $CaSiO_3$, graphitic-$C_3N_4$ and $MoO_3$ in a polar protic solvent and heating the dispersion at a temperature of from about 150 to about 250° C. at a pressure of from about 2 to about 8 bar. In some embodiments, polar protic solvent may include but are not limited to water, methanol, ethanol, propanol, iso-propanol, butanol, isobutanol, sec-butanol, tert-butanol, pentanol, hexanol, heptanol, octanol, nonanol, decanol, for-mic acid, acetic acid, propionic acid, butyric acid, lactic acid, glycolic acid, glycerol, ethylene glycol, propylene glycol, diethylene glycol, triethylene glycol, 1,2-butanediol, 1,3-butanediol, 1,2-pentanediol, and 1,3-propanediol. In a preferred embodiment, polar protic solvent is polyol. In some embodiments, the polyol has a number average molecular weight 200 to about 3,000, preferably 400 to about 2,500, preferably 800 to about 2,000, preferably 1,200 to about 1,500.

In some embodiments, the polyol is selected from the group consisting of: polyester polyols; polyether polyols; poly(ether-ester) polyols; poly(alkylene carbonate) polyols; and, mixtures thereof.

In some embodiments, the polyester polyols preferably include poly(ethylene glycol), poly(propylene glycol) and poly(tetrahydrofuran). The polyester polyols also include conventional polyester polyols, polycaprolactone polyols and polycarbonate diols, which contain ester groups or carbonate groups, and generally referred polyester polyols obtained by polycondensation of dicarboxylic acids with glycols and the like. The polyester polyols also include bio-based and eco-friendly polyester polyols.

In some embodiments, the solution is heated at a tem-perature in a range from 150 to 250° C., preferably 170 to 250° C., preferably 190 to 250° C., preferably 210 to 250° C., preferably 230 to 250° C. In a preferred embodiment, the solution is heated at 180° C. In some embodiments, the solution is heated for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the solution is heated for 1 hour. In some embodiments, the solution is heated at 180° C. at pressure ranging from 2 to 8 bar, preferably 3 to 8 bar, preferably 4 to 8 bar, preferably 5 to 8 bar, preferably 6 to 8 bar, preferably 7 to 8 bar. In a preferred embodiment, the solution is heated at a pressure is 5 bar.

At step 68, the method 50 includes separating the solid particulate crystalline nanocomposite from the heated dis-persion. This separation may be achieved using techniques such as filtration (e.g., gravity filtration, vacuum filtration, pressure filtration, or membrane filtration), centrifugation, decantation, gas flotation, capacitance-based separation, or microfiltration. Alternative separation methods include natu-ral and forced sedimentation, magnetic separation, vacuum distillation, chemical conversion, and chromatography. In a preferred embodiment, filtration is performed via a Buchner system.

The following examples are provided solely for illustra-tion and are not to be construed as limitations of the present disclosure, as many variations thereof are possible without departing from the spirit and scope of the present disclosure.

EXAMPLES

The following examples demonstrate a method of degrad-ing organic contaminants and method of fabrication thereof.

The examples are provided solely for illustration and are not to be construed as limitations of the present disclosure, as many variations thereof are possible without departing from the spirit and scope of the present disclosure.

Example 1: Fabricating the Calcium Metasilicate ($CaSiO_3$)

In the present disclosure equal moles of calcium nitrate ($Ca(NO_3)_2$) and sodium metasilicate ($Na_2SiO_3$) were dis-persed in 100 ml of ethanol ($C_6H_5OH$):water ($H_2O$) in a 1:1 mixture in a 150 millilitres (mL) glass beaker and sonicated for 15 minutes (min). The mixture was then transferred to a 200 mL autoclave and placed in an oven operated at 180° C. for 2.0 hours (h). The resulting product was dispersed in 500 mL of distilled water and subjected to ultrasonic treatment for 10 min. The solid was then filtered using a Buchner system, rinsed with distilled water, and dried at 120° C. for 1.0 h.

Example 2: Fabricating the Graphitic Carbon Nitride (g-$C_3N_4$)

For the fabrication of graphitic carbon nitride (g-$C_3N_4$), 30.0 grams (g) of urea was placed in a 250 mL porcelain crucible, covered with its porcelain lid. The entire crucible assembly was wrapped in three layers of aluminum (Al) foil to minimize urea loss due to evaporation. The crucible was then heated in a furnace set at 600° C. for 45 min, resulting in the formation of g-$C_3N_4$.

Example 3: Fabricating the Molybdenum Trioxide ($MoO_3$)

In the present disclosure, 10.0 grams (g) of ammonium molybdate ($(NH_4)_6Mo_7O_{24}\cdot4H_2O$) and 10.0 g of xylose ($C_5H_{10}O_5$) were placed in a 500 mL beaker. 100 mL of distilled water was added to the mixture, which was then heated until a clear solution was obtained. 10 mL of con-centrated nitric acid ($HNO_3$) was subsequently added, and the mixture was heated further until the carbonization of xylose occurred. The mixture was then placed in an oven set at 120° C. for 3.0 h. The resulting black product was ground using a mortar, transferred to a 150 mL porcelain dish, and calcined at 550° C. for 4.0 h to obtain the final molybdenum-based carbon composite.

Example 4: Fabricating the $CaMoO_4$@$CaSiO_3$ @g-$C_3N_4$

An equal amount of $CaSiO_3$, g-$C_3N_4$, and $MoO_3$ was transferred to a mono wave-200 vial (G30) and dispersed in 20 mL ethylene glycol monomethyl ether ($C_3H_8O_2$) via an ultrasonic bath for 30 minutes. The vial was closed with a Teflon cover and placed in the Anton Paar Monowave-200, which was operated at 180° C. and 5.0 bar pressure for 1 h. The resulting product was dispersed in 1 L of distilled water (DW) and subjected to ultrasonic treatment for 30 min. The solid was then filtered using a Buchner system, rinsed with distilled water, and dried at 150° C. for 2.0 h to obtain the final $CaMoO_4$@$CaSiO_3$ @g-$C_3N_4$ composite material.

Figure 2:
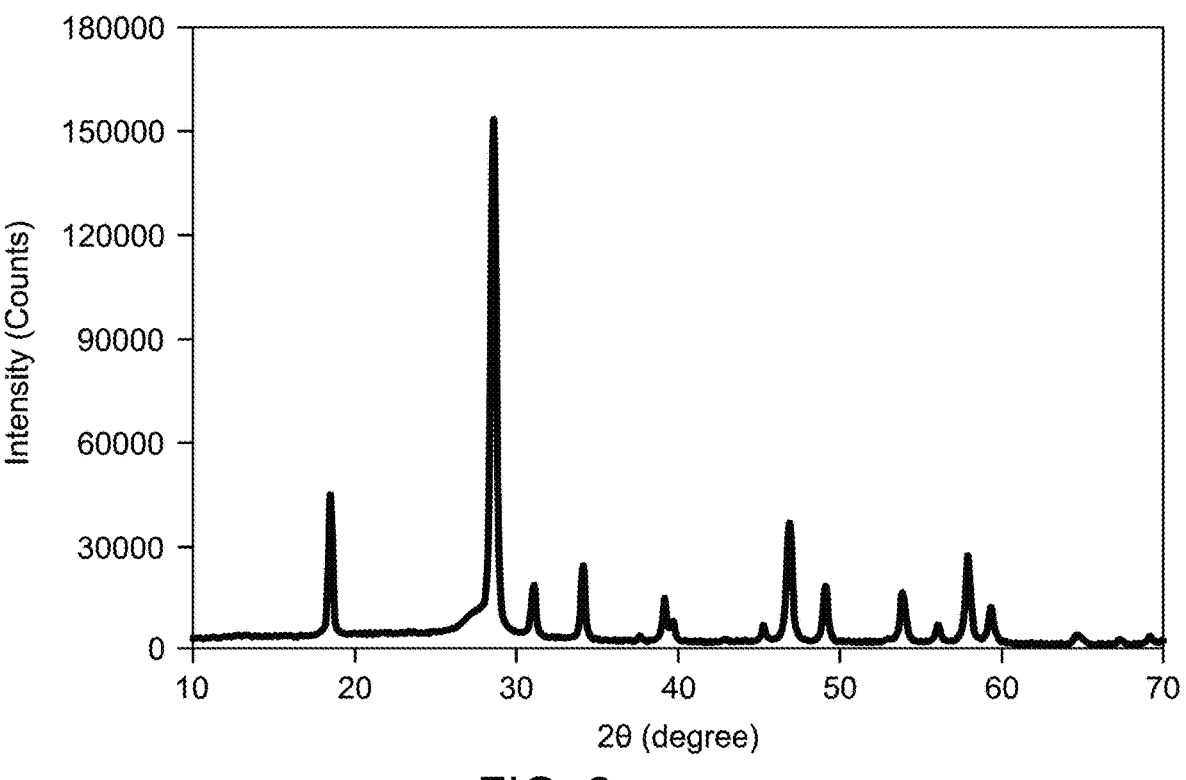
FIG. 2 depicts an X-ray diffraction (XRD) spectrum of the $CaMoO_4$/$CaSiO_3$/g-$C_3N_4$ nanocomposite, according to certain embodiments.

X-ray diffraction (XRD) patterns for the synthesized nanocomposite are shown in FIG. 2. In particular, FIG. 2 depicts the identification of structural and crystallographic properties of the $CaMoO_4$/$CaSiO_3$/g-$C_3N_4$ catalyst. The intense peaks and high intensity values indicated that the powder was highly crystalline. Examination of the diffraction patterns with the standard JCPDS cards, incorporated herein by reference in its entirety, revealed the presence of $CaMoO_4$ as a major and predominant phase, together with $CaSiO_3$ and g-$C_3N_4$ as minor phases. The diffraction lines with $2\theta°$ values of $18.6°$, $28.6°$, $31.2°$, $34.3°$, and $47.10$ were successfully indexed to the tetragonal $CaMoO_4$ JCPDS card (No. 00-029-0351), incorporated herein by reference in its entirety. The diffraction peaks for the catalyst were corresponding to the Miller indices (101), (112), (004), (200), and (204) plans.

The diffraction peaks for $CaSiO_3$ at $2\theta°$ values of $17.8°$, $30.7°$, and $34.10$ corresponded to the anorthic phase of $CaSiO_3$, identified using the JCPDS card (No. 01-072-1396) planes, incorporated herein by reference in its entirety. These diffractions originated from the Miller indices (111), (030), and (212) plans. The diffractions related to g-$C_3N_4$ were observed at 200 values of $46.8°$, and $59.5°$, identified using the COD (No. 00-050-1512), incorporated herein by reference in its entirety. Minor traces of $SiO_2$ were detected at $2\theta°$ values of $19.3°$ and $25.1°$, corresponding to the reference code (No. 00-049-0629), incorporated herein by reference in its entirety. All these results confirmed the successful fabrication of $CaMoO_4$/$CaSiO_3$/g-$C_3N_4$.

Figure 3A:
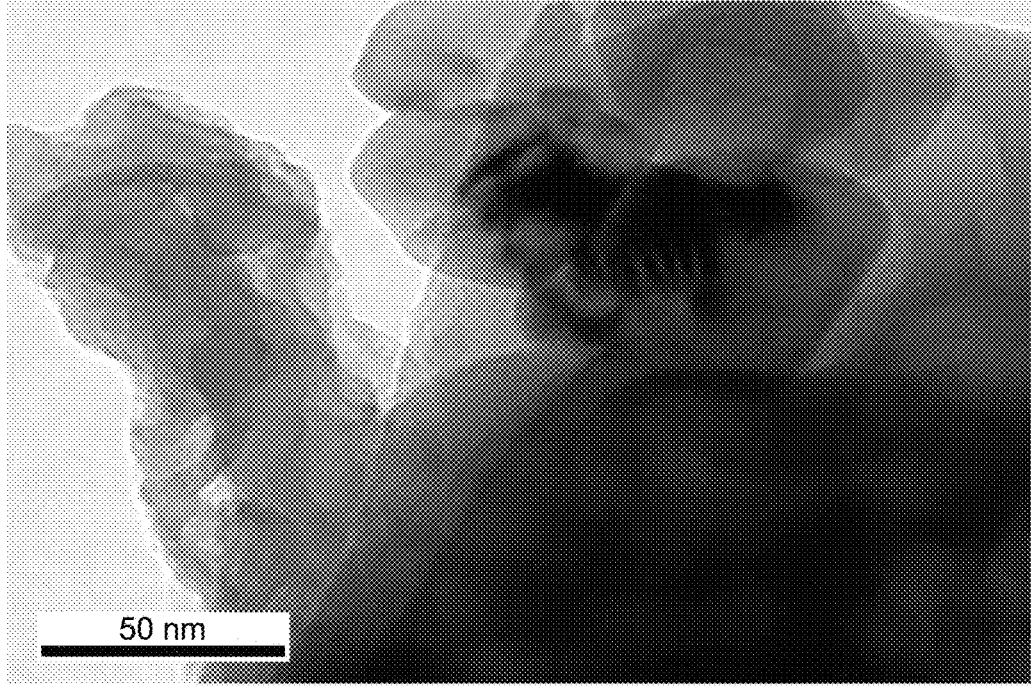
FIG. 3A is a transmission electron microscope (TEM) image of the $CaMoO_4$/$CaSiO_3$/g-$C_3N_4$ nanocomposite with a scale bar of 50 nanometers (nm), according to certain embodiments.
Figure 3B:
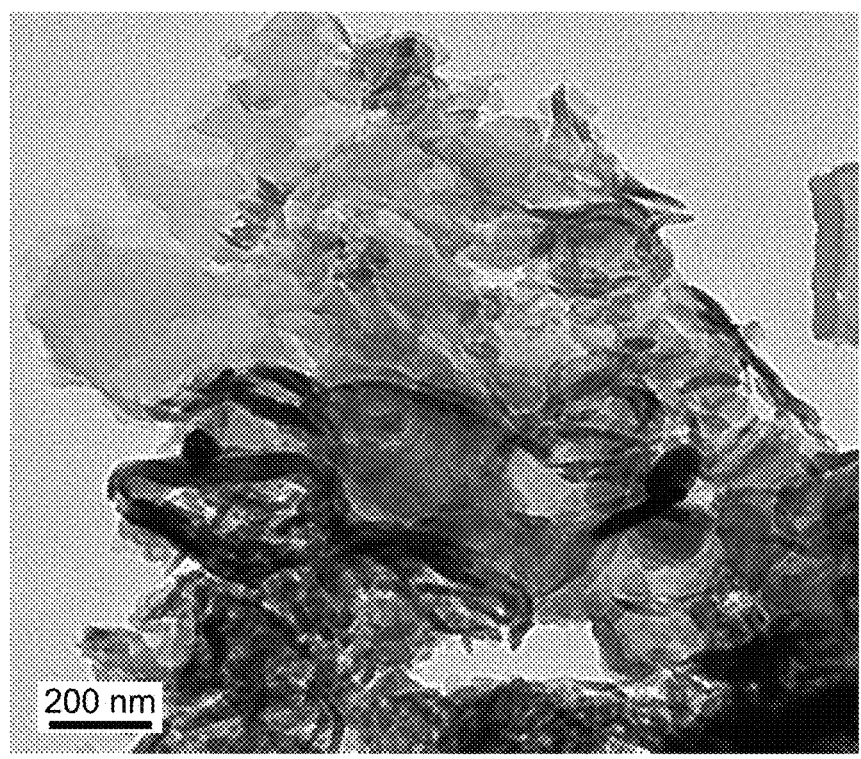
FIG. 3B is a TEM image of the $CaMoO_4$/$CaSiO_3$/g-$C_3N_4$ nanocomposite with a scale bar of 200 nm, according to certain embodiments.
Figure 3C:
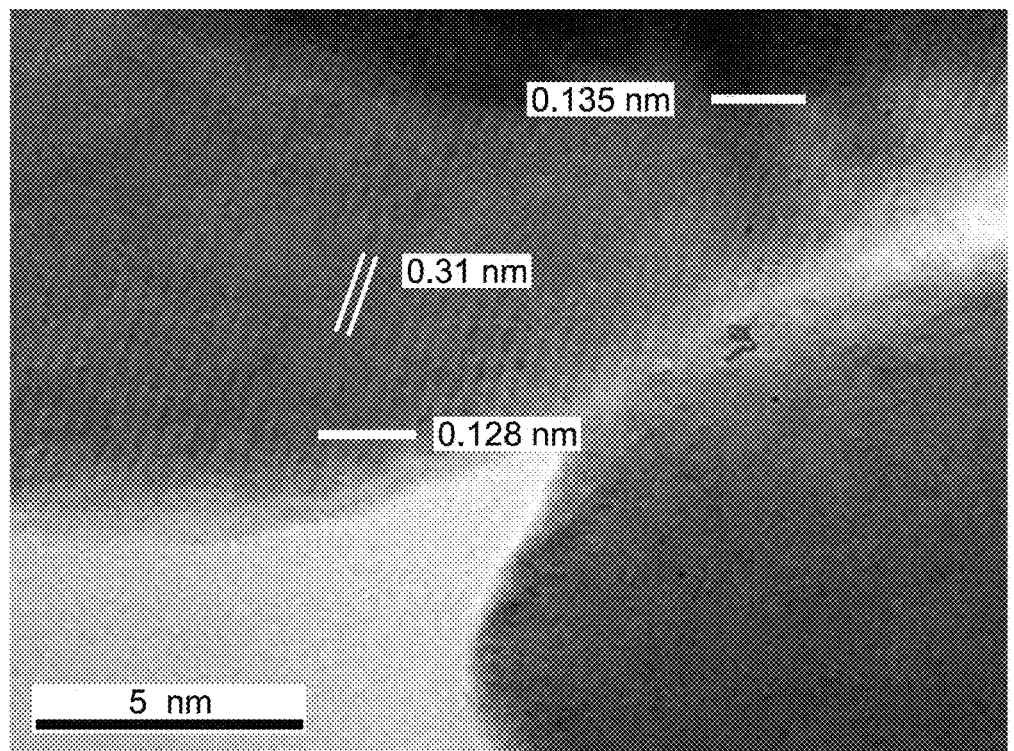
FIG. 3C is a high-resolution transmission electron microscopic (HR-TEM) image of the $CaMoO_4$/$CaSiO_3$/g-$C_3N_4$ nanocomposite with a scale bar of 5 nm, showing lattice fringes and well-defined crystallinity, according to certain embodiments.
Figure 3D:
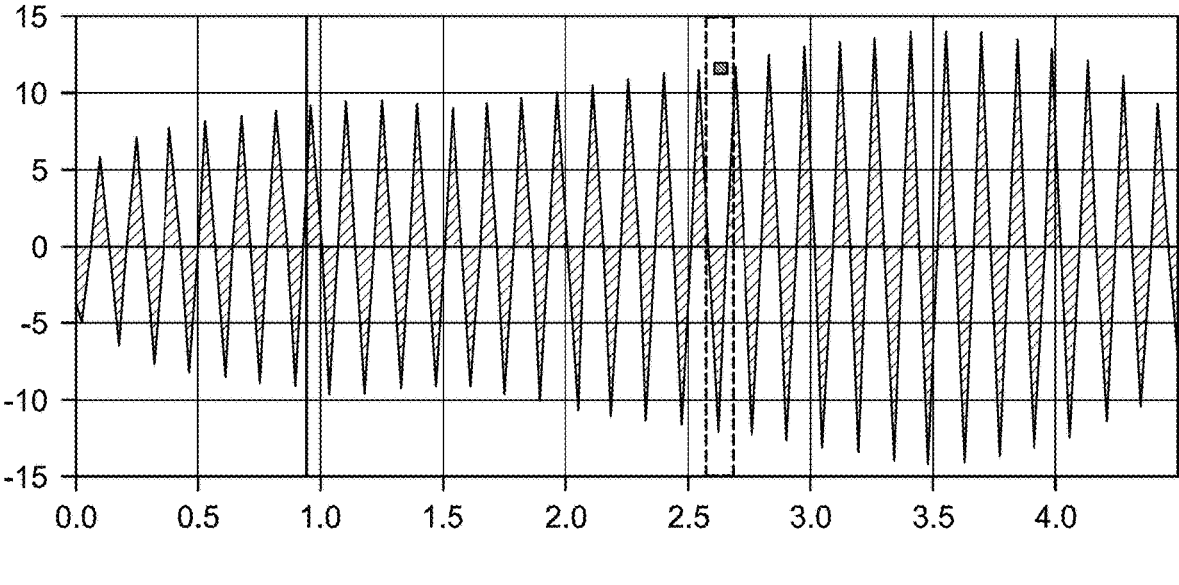
FIG. 3D is a Fast Fourier Transform (FFT) pattern of the $CaMoO_4$/$CaSiO_3$/g-$C_3N_4$ nanocomposite, according to certain embodiments.
Figure 3E:
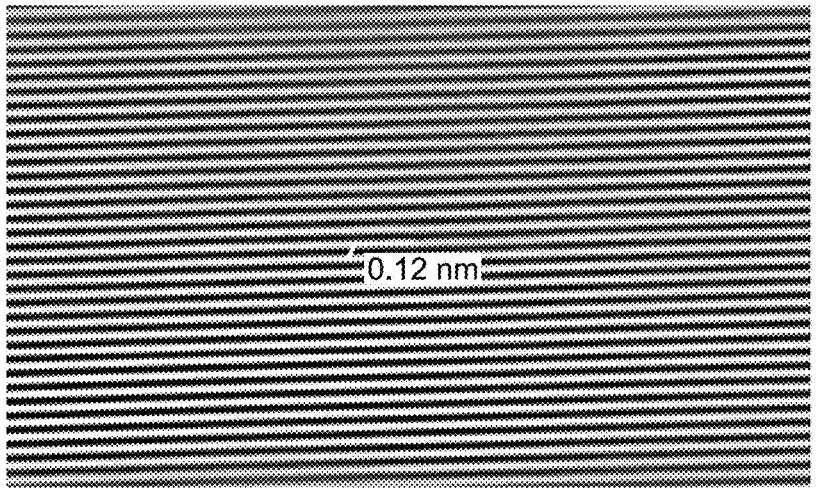
FIG. 3E is an Inverse Fast Fourier Transform (IFFT) pattern of the $CaMoO_4$/$CaSiO_3$/g-$C_3N_4$ nanocomposite, according to certain embodiments.
Figure 3F:
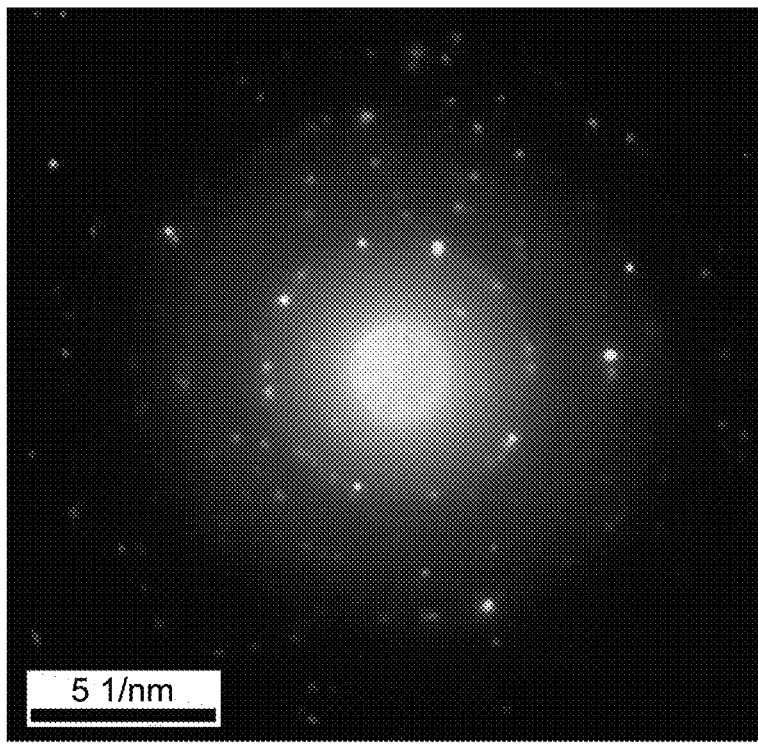
FIG. 3F depicts a selected area electron diffraction (SAED) pattern of $CaMoO_4$/$CaSiO_3$/g-$C_3N_4$ nanocomposite, indicating the presence of a polycrystalline structure, according to certain embodiments.

Transmission electron microscopy (TEM) images of the $CaMoO_4$/$CaSiO_3$/g-$C_3N_4$ nanocomposite are shown in FIGS. 3A-3B. The TEM images showed that two-dimensional (2D) porous structure was constructed with curled and wrinkled nanosheets and platelets of the g-$C_3N_4$. The images shown well dispersion of homogeneous spherical metal oxides nanoparticles with a size of 9.2 nm on the nanosheets of g-$C_3N_4$. The corresponding SAED pattern revealed diffraction spots with interplanar spacings of 0.42 nm, 0.27 nm, and 0.206 nm, 0.179, and 0.144 nm corresponding to (Ca-$SiO_3$; 120, $CaMoO_4$: 101), ($CaMoO_4$: 200, $CaSiO_3$:122, g-$C_3N_4$; 20), ($CaMoO_4$: 213, $CaSiO_3$:013), ($CaMoO_4$: 220, $CaSiO_3$:250), and ($CaMoO_4$: 321, $CaSiO_3$: 330) diffraction planes (FIG. 3F). The corresponding HRTEM of the composite showed a plane spacing of 0.31 nm related to the ($CaMoO_4$: 112, g-$C_3N_4$; 110), where 0.135 nm, and 0.128 nm were related, respectively, to ($CaMoO_4$: 112, g-$C_3N_4$; 221, $CaMoO_4$: 323), and ($CaMoO_4$: 400), planes, characterizing the heterostructure formation (FIG. 3C). The FFT and IFFT measurements showed a d value of 0.12 nm for the $CaMoO_4$/$CaSiO_3$/g-$C_3N_4$ nanocomposite, signifying the lattice spacing of ($CaMoO_4$: 332, g-$C_3N_4$; 410) indicating the development of the g-$C_3N_4$ structure (FIG. 3D and FIG. 3E).

Figure 4A:
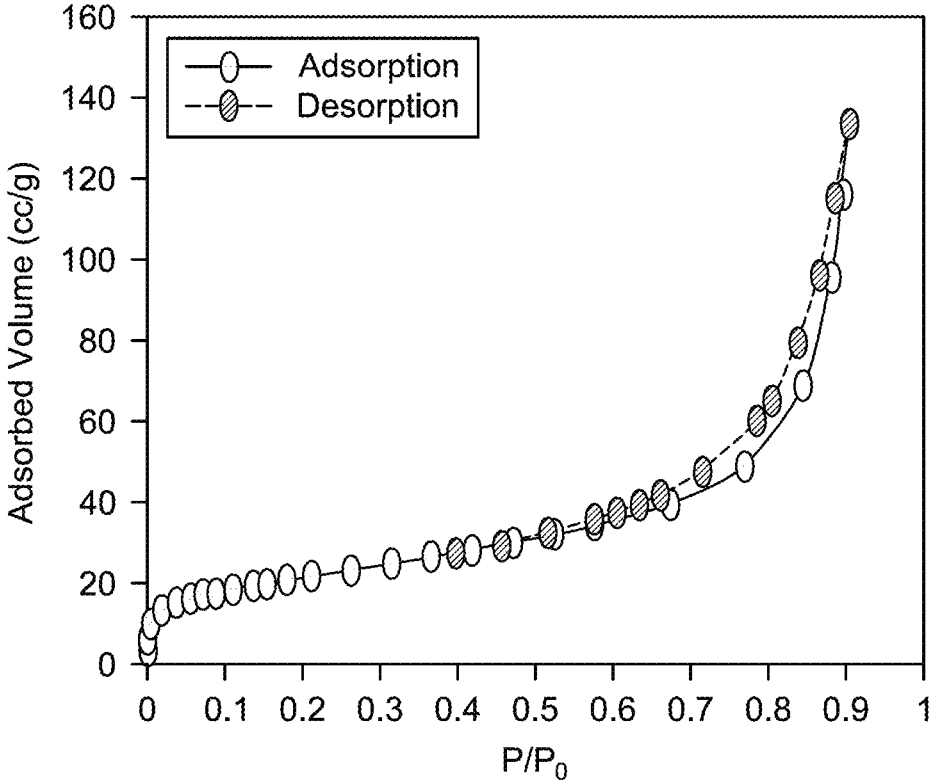
FIG. 4A shows a nitrogen ($N_2$) adsorption-desorption isotherm of the $CaMoO_4$/$CaSiO_3$/g-$C_3N_4$ nanocomposite, according to certain embodiments.
Figure 4B:
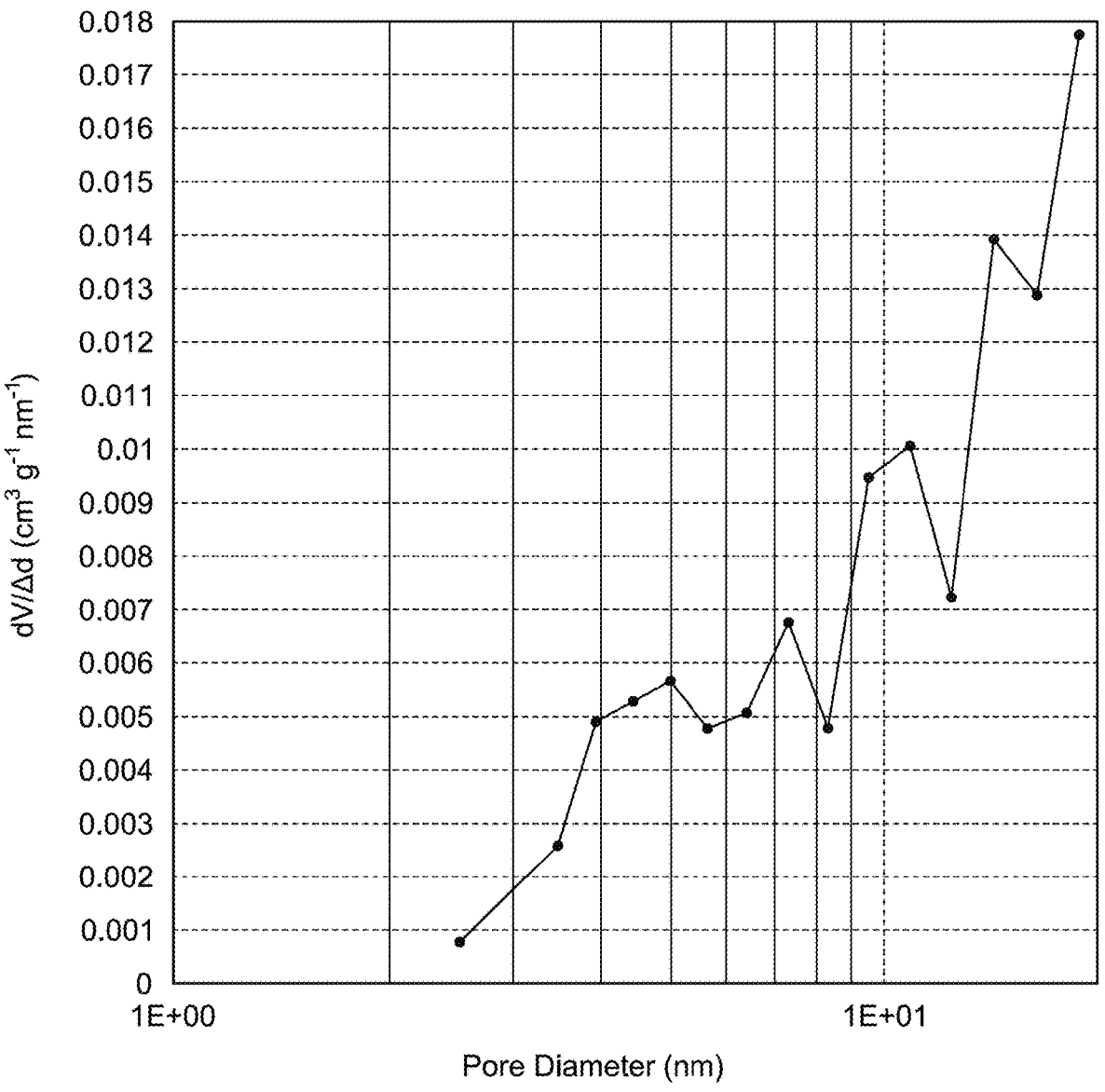
FIG. 4B shows a pore size distribution of the $CaMoO_4$/$CaSiO_3$/g-$C_3N_4$ nanocomposite, according to certain embodiments.

Further, FIGS. 4A-4B illustrates the nitrogen adsorption-desorption isotherms of the $CaMoO_4$/$CaSiO_3$/g-$C_3N_4$ nanocomposite. The nitrogen sorption isotherm of the belonged to type IV with a noticeable hysteresis loop, indicating the formation of mesoporous structures. However, shifting the loop to a relatively higher pressure (P/P0=0.63-1) indicates the presence of wide mesopores, which may result from the deposition of metal oxides particles in the wide pores of g-$C_3N_4$. Furthermore, the Brunauer-Emmett-Teller (BET) surface area of the $CaMoO_4$/$CaSiO_3$/g-$C_3N_4$ sample was calculated to be 78.1-meter square per gram $(m^2g^{-1})$. The marked high specific surface area reflects the good dispersion of these metal oxides nanoparticles on g-$C_3N_4$. and $CaSiO_3$. Moreover, the pore size distribution curves, plotted using the Barrett-Joyner-Halenda (BJH) method, for the $CaMoO_4$/$CaSiO_3$/g-$C_3N_4$ sample exhibited unimodal distribution with average pore diameters maximized at 18.92 nm and pore volume of 0.21 cubic centimeters per gram $(cm^3g^{-1})$. All the isotherms belonged to the category H3 type of pores, which did not exhibit limiting adsorption at high P/Po and arise due to aggregation of plate-like particles giving rise to slit-shaped pores. This indicated that the assembly of the $CaMoO_4$/$CaSiO_3$/g-$C_3N_4$ composite resulted in a mesoporous array.

The utilization of the wide-range visible-light-region in photocatalytic processes requires a low bandgap of 1.77 eV to 2.92 eV. as a candidate for visible light absorption and utilization in photocatalytic purposes [See: Li, Y. and researchers, *Efficient decomposition of organic compounds and reaction mechanism with BiOI photocatalyst under visible light irradiation*, 2011, incorporated herein by reference in its entirety]. One of the main goals of using a visible light induced photocatalyst is to displace harmful ultraviolet light with safe visible light. The absorbance of the prepared $CaMoO_4$/$CaSiO_3$/g-$C_3N_4$ was measured in the range of 200 nm to 800 nm. It's interesting to note that when the $CaMoO_4$/$CaSiO_3$ was incorporated with g-$C_3N_4$, the composite's absorption in the visible region progressively increased. The difference between the bandgap energies of $CaMoO_4$/$CaSiO_3$ and bare g-$C_3N_4$ may be the cause of this phenomenon. The Tauc plot was employed to determine the bandgap energy (Eg) for the synthesized photocatalyst, as given in equation 1.

$$\alpha h\gamma = A(h\gamma - Eg)n \qquad (1)$$

Where, h represents the Plank constant, $\alpha$ and $\gamma$ are the absorption coefficient and photonic frequency [See: Cheng, H. and researchers, One-step synthesis of the nanostructured AgI/BiOI composites with highly enhanced visible-light photocatalytic performances, 2010, incorporated herein by reference in its entirety]. By calculating the power of n, a value of n=½ was revealed to propose a direct permissible transition.

Figure 5:
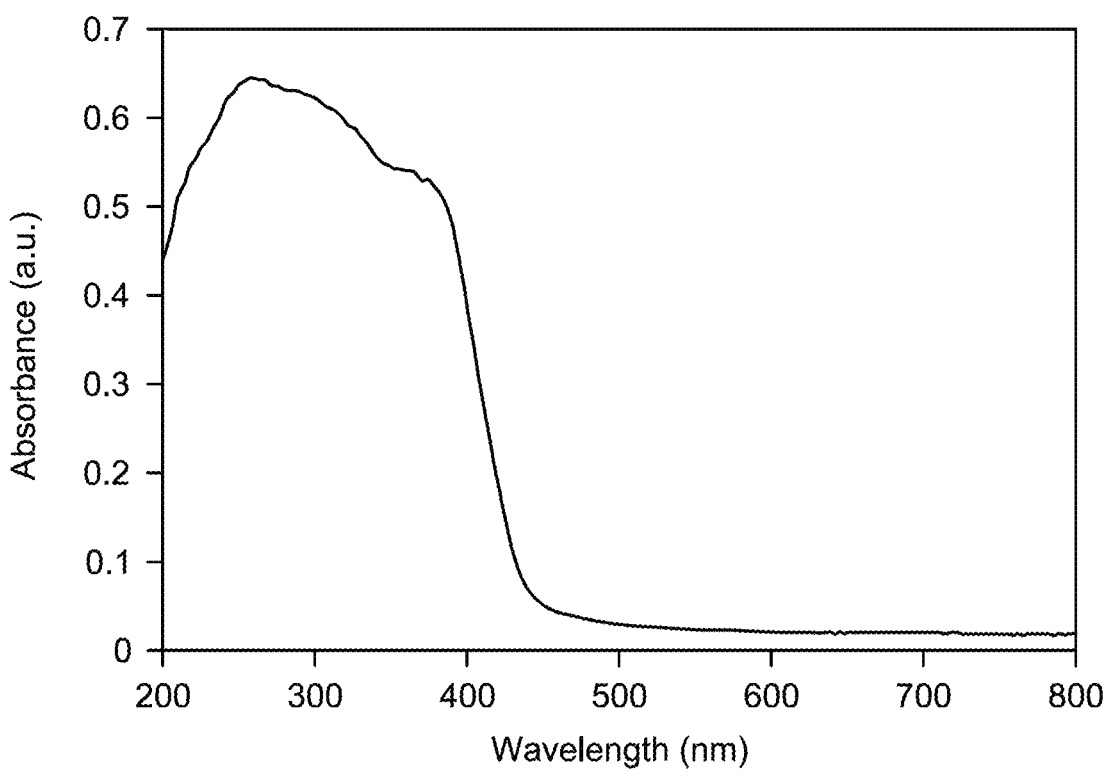
FIG. 5 shows an ultraviolet-visible diffuse reflectance spectroscopy (UV-vis DRS) spectrum of the $CaMoO_4$/$CaSiO_3$/g-$C_3N_4$ nanocomposite, according to certain embodiments.
Figure 6:
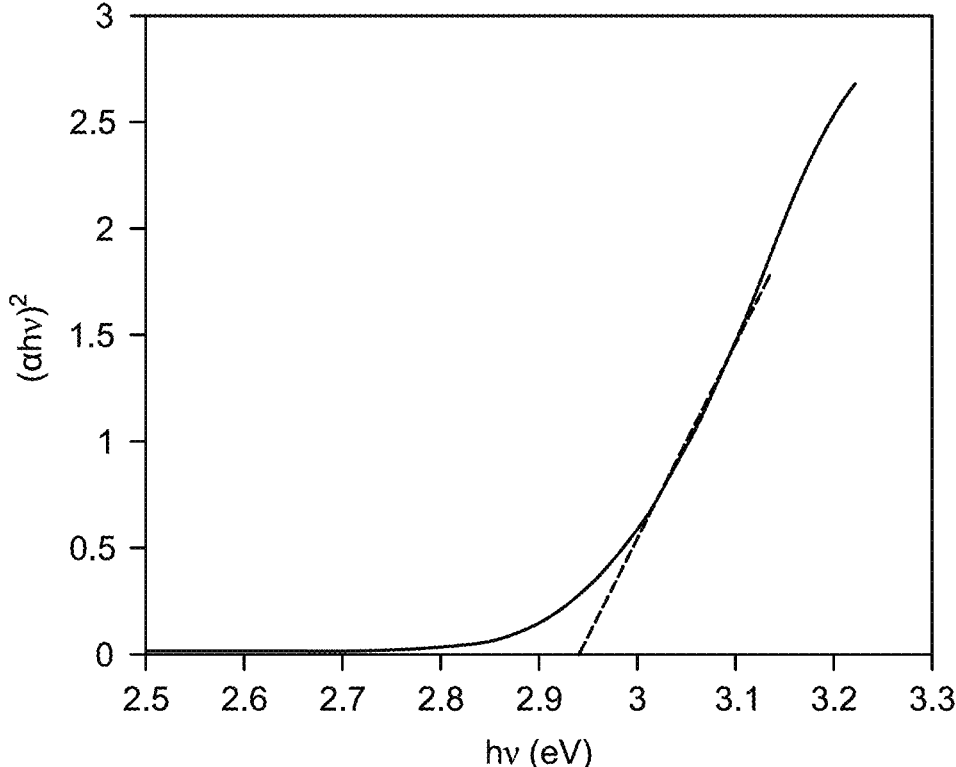
FIG. 6 shows a band gap energy of the $CaMoO_4$/$CaSiO_3$/g-$C_3N_4$ nanocomposite corresponding to the UV-vis DRS spectra, according to certain embodiments.

As shown in FIG. 5 and FIG. 6, the bang gap (Eg) was estimated at 2.94 eV, corresponding to the $CaMoO_4$/$CaSiO_3$/g-$C_3N_4$ composite. The reduced band gap of the $CaMoO_4$/$CaSiO_3$/g-$C_3N_4$ composite and more response to the visible light were caused by the inserting of metal oxides nanoparticles on g-$C_3N_4$, thus more efficient utilization of solar energy may be achieved, and the improved photocatalytic activity of the $CaMoO_4$/$CaSiO_3$/g-$C_3N_4$ composite may be anticipated. The estimated band gap was typical of bismuth oxyiodide (BiOI) known for its high activity in degrading organic compounds under visible light [See: Mehrali-Afjani, M. and researchers, *A brief study on the kinetic aspect of the photodegradation and mineralization of BiOI-Ag$_3$PO$_4$ towards sodium diclofenac*, 2020, incorporated herein by reference in its entirety].

Numerous modifications and variations of the present disclosure are possible in light of the above teachings. It is, therefore, to be understood that within the scope of the appended claims, the invention may be practiced otherwise than as specifically described herein.

The invention claimed is:

1. A method of photocatalytic degradation, comprising:
   contacting a particulate crystalline nanocomposite with an aqueous medium comprising one or more contaminants to form a pre-irradiation mixture,
   wherein the particulate crystalline nanocomposite comprises a tetragonal $CaMoO_4$ crystalline phase, a $CaSiO_3$ crystalline phase, and a graphitic-$C_3N_4$ crystalline phase having at least a fraction of the graphitic-$C_3N_4$ in the form of mesoporous nanosheets;
   irradiating the pre-irradiation mixture with a radiation having a wavelength of from about 100 to about 800 nm; thereby
   degrading the one or more contaminants on the particulate crystalline nanocomposite, wherein at least a fraction of the $CaMoO_4$ and at least a fraction of the $CaSiO_3$ of the particulate crystalline nanocomposite are in the form of spherical particles.

2. The method according to claim 1, wherein the one or more organic contaminants comprises one or more compounds of polyaromatic hydrocarbons and their halogenated derivatives, phenols and their halogenated derivatives, furanes and their halogenated derivatives, dioxines and their halogenated derivatives, biphenyls and their halogenated derivatives, and organic dyes.

3. The method according to claim 1, wherein a ratio by weight of $CaMoO_4$ to $CaSiO_3$ to graphitic-$C_3N_4$ in the particulate crystalline nanocomposite is about (0.8-1.2) to (0.8-1.2) to (0.8-1.2).

4. The method according to claim 1, wherein:

at least 50 wt. % of the $CaMoO_4$ of the particulate crystalline nanocomposite is in the form of spherical particles, based on a total weight of the $CaMoO_4$, and at least 50 wt. % of the $CaSiO_3$ of the particulate crystalline nanocomposite is in the form of spherical particles, based on a total weight of the $CaSiO_3$.

5. The method according to claim 1, wherein the spherical particles have an average particle size of from about 5 to about 20 nm.

6. The method according to claim 1, wherein at least 80 wt. % of the graphitic-$C_3N_4$ is in the form of mesoporous nanosheets, based on a total weight of the graphitic-$C_3N_4$.

7. The method according to claim 1, wherein the particulate crystalline nanocomposite has a monomodal pore size distribution.

8. The method according to claim 1, wherein the particulate crystalline nanocomposite has an average pore diameter of from about 15 to about 25 nm.

9. The method according to claim 1, wherein the particulate crystalline nanocomposite has a Brunauer-Emmett-Teller (BET) surface area of from about 60 to about 100 $m^2$/g.

10. The method according to claim 1, wherein the particulate crystalline nanocomposite has a BET surface area of from about 70 to about 90 $m^2$/g.

11. The method according to claim 1, wherein the particulate crystalline nanocomposite has a pore volume of from about 0.1 to about 0.5 $cm^3$/g.

12. The method according to claim 1, wherein the particulate crystalline nanocomposite has a band gap energy (Eg) between a valence band and a conduction band of from about 2.8 to about 3.2 eV.

13. The method according to claim 1, wherein the particulate crystalline nanocomposite is obtained by a process comprising:

forming a solution of a calcium salt and an alkali metal silicate in a solvent comprising water and a $C_1$-$C_4$ alkanol;

heating the solution at a temperature of from about 150° C. to about 250° C. to form a dry product of $CaSiO_3$;

forming graphitic-$C_3N_4$ by heating urea in a closed vessel at a temperature of about 500° C. to about 700° C.;

forming an acidified solution in a polar protic solvent of a molybdenum salt and a reducing sugar;

heating the acidified solution at a temperature of from about 150° C. to about 250° C. for a sufficient duration to carbonize the reducing sugar and form a carbonized product;

comminuting the carbonized product of the heating stage to form a comminuted carbonized product;

calcining the comminuted carbonized product at a temperature of from about 500° C. to about 1200° C. for a duration of from about 1 to about 5 hours to form $MoO_3$;

dispersing the $CaSiO_3$, graphitic-$C_3N_4$ and $MoO_3$ in a polar protic solvent and heating the dispersion at a temperature of from about 150° C. to about 250° C. at a pressure of from about 2 to about 8 Bar to form the particulate crystalline nanocomposite in a form of a solid; and separating the solid particulate crystalline nanocomposite from the heated dispersion.

14. The method according to claim 1, wherein the contacting has a duration of from about 1 to about 120 minutes.

15. The method according to claim 1, wherein the contacting has a duration of from about 5 to about 30 minutes.

16. The method according to claim 1, wherein the radiation has a wavelength of from about 100 to about 500 nm.

17. The method according to claim 1, wherein the particulate crystalline nanocomposite is dispersed within the aqueous medium.

18. The method according to claim 1, wherein the particulate crystalline nanocomposite is in an amount of from about 0.1 to about 5 grams per liter of the aqueous medium.

* * * * *